United States Patent [19]

Takasaki

[11] Patent Number: 5,737,936
[45] Date of Patent: Apr. 14, 1998

[54] AIR CONDITIONING APPARATUS FOR VEHICLE

[75] Inventor: Junji Takasaki, Okazaki, Japan

[73] Assignee: Denso Corporation, Kariya, Japan

[21] Appl. No.: 771,899

[22] Filed: Dec. 23, 1996

[30] Foreign Application Priority Data

Dec. 27, 1995 [JP] Japan .................................. 7-341458

[51] Int. Cl.$^6$ .................................................. F25D 19/00
[52] U.S. Cl. .............................. 62/298; 62/259.1; 165/122
[58] Field of Search ................................... 62/259.1, 296, 62/298, 404, 407, 412, 515, 516, 517, 518; 165/75, 122

[56] References Cited

U.S. PATENT DOCUMENTS 2,747,381  5/1956  Lazar ................................. 165/122
5,193,609  3/1993  Cowart .............................. 165/122

*Primary Examiner*—John M. Sollecito
*Attorney, Agent, or Firm*—Harness, Dickey & Pierce, PLC

[57] ABSTRACT

A sealing member is continuously formed along the periphery of a cover for closing an opening of an air conditioning body unit by painting, and starting and terminating ends of the sealing member correspond to a position of an insulator of inlet and outlet pipes extending from the opening. Even when the positions of the starting and terminating ends are deviated to some extent, the sealing performance can be certainly secured by absorbing such a deviation with the wall thickness of the insulator.

10 Claims, 3 Drawing Sheets

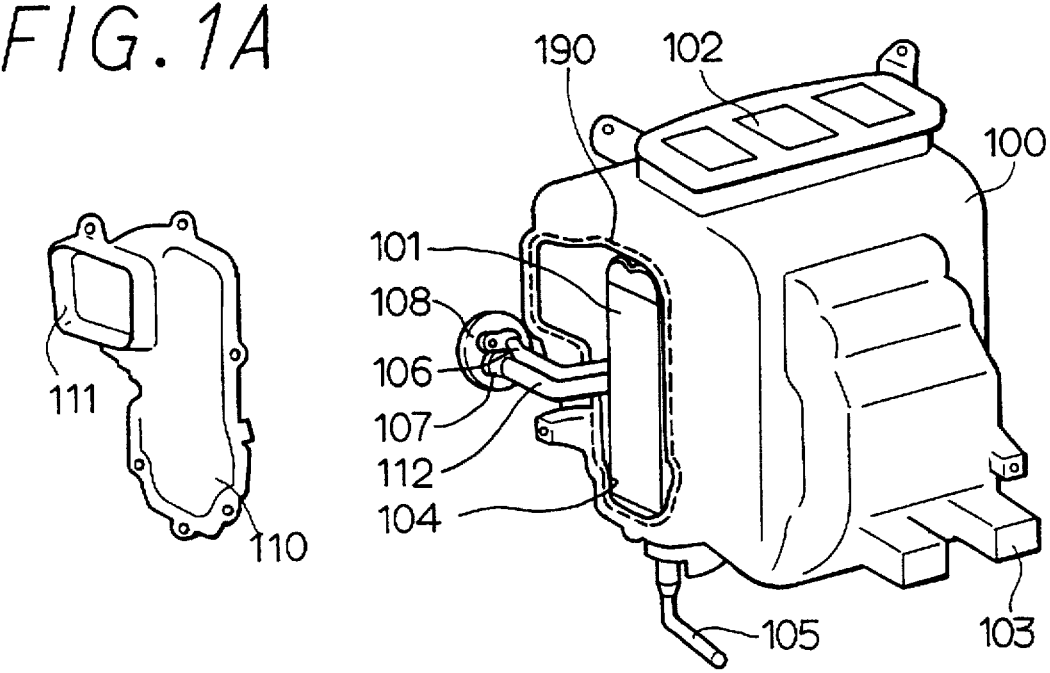
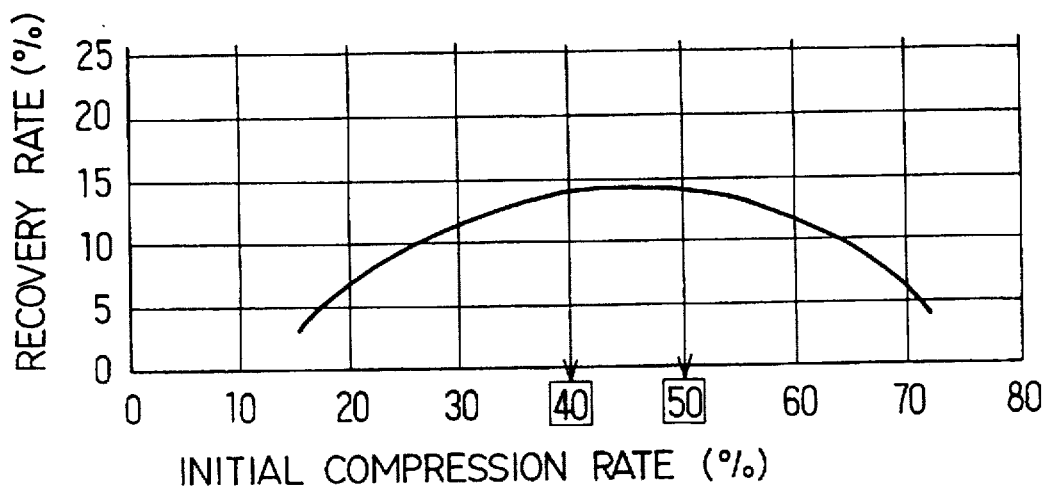

AIR CONDITIONING APPARATUS FOR VEHICLE

CROSS REFERENCE TO THE RELATED APPLICATION

This application is based on and claims priority of Japanese Patent Application No. Hei. 7-341458 filed on Dec. 27, 1995, the content of which is incorporated herein by reference.

BACKGROUND OF THE INVENTION

1. Field of the Invention

The present invention relates to an air conditioning apparatus for a vehicle, which performs air-conditioning of the passenger compartment of the vehicle, especially, performs cooling of the passenger compartment.

2. Description of Related Art

Conventionally, in the air conditioning apparatus for a vehicle, an evaporator is inserted into the air conditioning body unit through an opening portion formed in the air conditioning body unit. The opening for receiving the evaporator is closed by a cover after the evaporator has been installed in the air conditioning body unit.

SUMMARY OF THE INVENTION

The present invention is made to improve the sealing of the cover which closes an opening formed in the air conditioning body unit as described above. It is an object of the present invention to simplify the method of forming a sealing material for sealing between the cover and the air conditioning body unit and to ensure that the sealing effect can be certainly performed by the sealing member.

According to the present invention, a sealing member is continuously formed along a periphery of a cover for closing an opening of an air conditioning body unit, and starting and terminating ends of the sealing member overlap with an insulator of pipes extending from the opening. By painting and continuously forming the sealing member around the opening, the sealing member completely seals the opening without forming a gap between the opening periphery and the cover. Particularly, the starting and terminating ends of the sealing member, which may cause a problem in painting and continuously forming a sealing member, are positioned so as to correspond to a position of the insulator. Even if the positions of the starting end and the terminating end are deviated, such a positional deviation of the starting or terminating end can be absorbed by a thickness of the insulator. That is, by the combination of the sealing member and the insulator, the air leakage from the opening can be certainly prevented.

The sealing member may be formed of an isocyanate-base fluidized foaming material. In this way, the sealing member around the opening can be formed by simply painting the sealing member along the periphery of the opening, thus improving the working efficiency.

BRIEF DESCRIPTION OF THE DRAWINGS

The foregoing and further objects, features and advantages of the present invention will become apparent from the following description of preferred embodiments with reference to the accompanying drawings, wherein:

FIG. 1A is a perspective view of a cover of an air conditioning apparatus, and FIG. 1B is a perspective view of a body unit, according to a first embodiment of the present invention;

FIG. 3 is a graph indicating the relationship between an initial compression rate and a recovery rate of a sealing member according to the first embodiment.

DETAILED DESCRIPTION OF PREFERRED EMBODIMENTS

Figure 2:
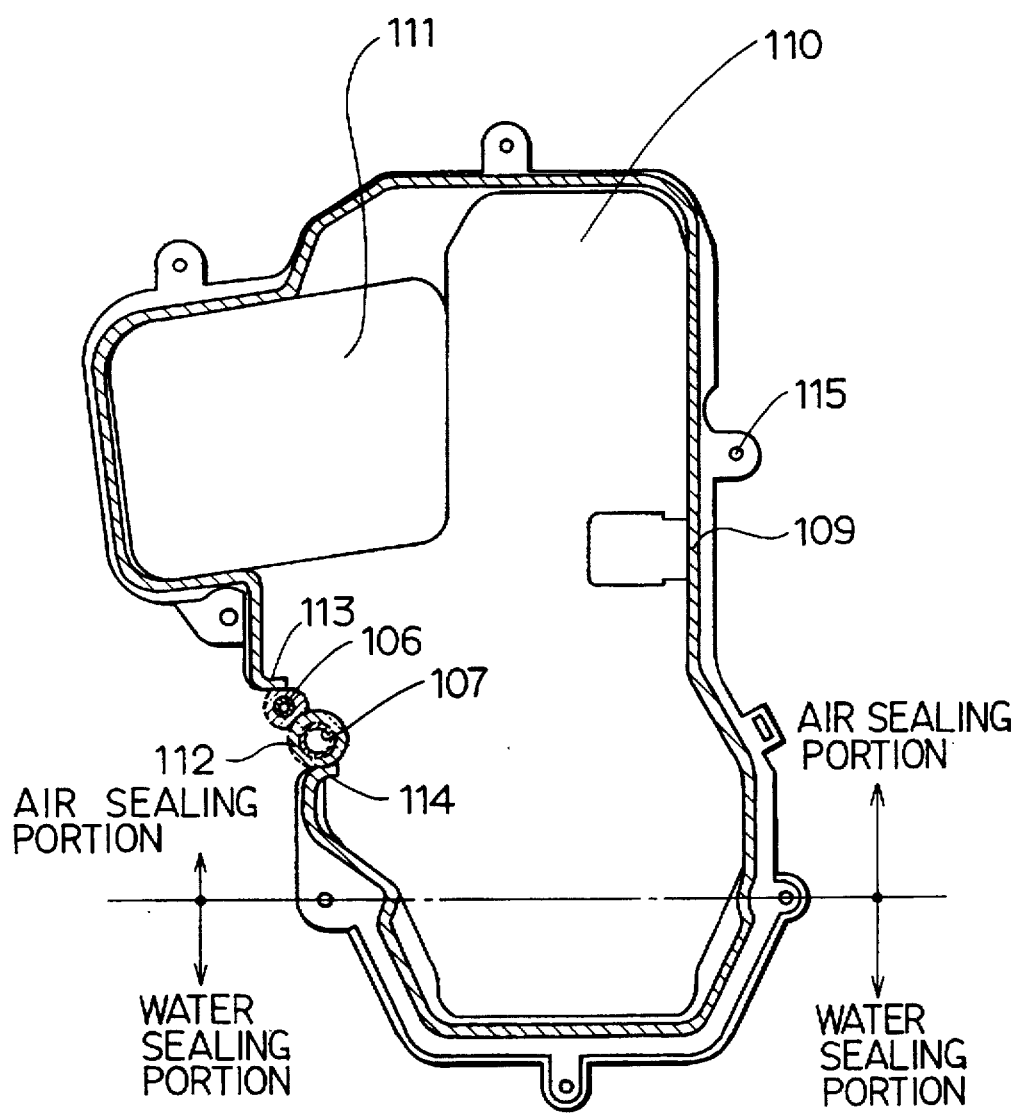
FIG. 2 is a front view of the cover shown in FIG. 1, viewed from the air conditioning body unit.

Preferred embodiments of the present invention will be described hereinafter with reference to the accompanying drawings.

Referring to FIG. 1, a first embodiment of the present invention will be described.

In an air conditioning body unit 100, an evaporator 101, a heater core (not shown) are disposed. Air cooled or heated by the evaporator 101 or the heater core is suitably blown out into a passenger compartment from air outlets 102 and 103. The air outlet 102 is an upper outlet which is branched through ducts (not shown) into a face air outlet for blowing out air toward an upper body of a passenger and a defroster air outlet for blowing out air toward a windshield. The air outlet 103 is a heater air outlet for blowing out warm air toward feet of the passenger.

An opening 104 is formed in a side wall of the air conditioning body unit 100. Through the opening 104, the evaporator 101 is inserted into the unit 100 or taken out. Therefore, an area of the opening 104 is not less than a projected area of the evaporator 101.

The air conditioning body unit 100 has a drain port opened at a lower portion of the unit 100, for draining water produced by the evaporator 101. The drain port is connected to a pipe 105 for discharging the drain water to the outside of the passenger compartment.

The evaporator 101 cools air passing in the air conditioning body unit 100. Heat is absorbed from the air by vaporization of a coolant passing through the evaporator 101. For this purpose, the evaporator 101 is connected with an inlet pipe 106 for supplying the coolant to the evaporator 101 and an outlet pipe 107 for discharging the coolant. The two pipes 106 and 107 are disposed adjacent to each other, and ends of the pipes 106 and 107 are connected to a joint 108. The joint 108 is connected to an opening formed in a partition for partitioning the passenger compartment and an engine compartment of the vehicle. The inlet pipe 106 and the outlet pipe 107 are connected to a condenser and a compressor disposed in the engine compartment, respectively.

The opening 104 of the air conditioning body unit 100 is covered with a cover 110 so that no air leaks from the opening 104. The cover 110 is secured to the unit 100 by bolts (not shown).

The cover 110 has an air inlet opening 111 as shown in FIG. 1, through which the inside air inside the passenger compartment or the outside air outside the passenger compartment is selectively into the air conditioning body unit 100 by a fan (not shown).

A sealing member 109 is continuously painted and formed on a periphery of the cover 110 as shown in FIG. 2 which illustrates the back surface of the cover 110. In FIG. 2, the inlet and outlet pipes 106 and 107, and an insulator 112 for covering the pipes 106 and 107 are not viewed actually, however, these are illustrated to show the positional relation with the sealing member 109 (described later) for purposes of convenience.

In this embodiment, the starting end 113 of the sealing member 109 is located at a portion of the insulator 112 covering the inlet pipe 106, and the terminating end 114 is located at a portion of the insulator 112 covering the outlet pipe 107, as shown in FIG. 2.

The pipes 106 and 107 are formed of an aluminum material, and the insulator 112 covering the pipes 106 and 107 is made of an ethylene-propylene rubber-type foam material.

The sealing member 109 is formed of a fluidized foaming material, which is an isocyanate material according to this embodiment. The isocyanate material according to the embodiment has a relatively high side-chain content of approximately 1.8%. The recovery rate of the sealing member 109 after high-temperature and high-humidity endurance is improved by increasing isocyanate side-chain content.

In this embodiment, the initial compression rate is also set to 40–50% to improve the recovery rate after high-temperature and high-humidity endurance. Experimental data regarding the initial compression rate and the recovery rate is shown in FIG. 3. The recovery rate after the high-temperature and high-humidity endurance indicates how much of the initial shape of the sealing member recovers when released from a compressed state that has been exposed under a high temperature and a high humidity for a long time. The initial compression rate indicates the percentage of a compressed volume performed by the initial compression with respect to the original volume.

As can be seen from the graph of FIG. 3, it is preferable that the initial compression rate should be approximately 40–50% to improve the recovery rate after high-temperature and high-humidity endurance.

A method of painting the sealing member 109 as shown in FIG. 2 will be described.

The sealing member is painted on the surface of the cover 110 along an outer surface thereof by continuously extracting an isocyanate paste. A volume of the painted isocyanate material immediately expands up to about 70% of the final expansion volume, that is, to about twice the volume in the paste state.

Then, the cover 110 on which the expanded isocyanate sealing member is painted is placed in a furnace which is maintained at a temperature of about 60° C. and a humidity of about 80%. The cover 10 is humidified and heated for about 25 minutes in the furnace, thus performing the secondary expansion. By the secondary expansion, the sealing member expands to the final volume.

After the sealing member 109 is formed, the cover 110 is positioned to the opening 104 of the air conditioning body unit 100 and then screwed to the case of the unit 100 by using mount holes 115 of the cover 110.

When the cover 110 is secured, the starting end 113 and the terminating end 114 of the sealing member 109 overlap with the insulator 112 covering the pipes 106 and 107 extending from the opening 104.

However, when the sealing member 109 is painted to the periphery of the cover 110 by a painting machine, the set position of the cover 110 may be shifted or the initial position setting of the painting machine may be deviated. When the starting end 113 is set to be completely coincident with the terminating end 114 of the sealing member 109, the positional control will become extremely complicated and the working efficiency will deteriorate. However, according to the embodiment, the positions of the starting and terminating ends 113 and 114 are separately determined corresponding to the portion of the insulator 112 covering the pipes 106 and 107, respectively. Therefore, if the starting end 113 or the terminating end 114 deviates to some extent, the deviation is compensated by the wall thickness of the insulator 112.

Since air blown by the fan (not shown) flows into the air conditioning body unit 100 for air conditioning, air leakage from the cover 110 for closing the opening 104 of the unit 100 will directly affect the air conditioning performance. Therefore, the sealing member 109 must prevent air leakage. In addition, a lower portion of the sealing member 109 also performs a function of preventing the drain water produced by the evaporator 101 from flowing outside the air conditioning unit 100. Thus, the sealing function of the sealing member 109 is extremely significant in view of the water leakage prevention.

According to the embodiment, since the positions of the starting and terminating ends 113 and 114 correspond to those of the pipes 106 and 107, respectively, and the pipes 106 and 107 are positioned to a central portion of the evaporator 101, there is no possibility that the water accumulated at a lower portion of the evaporator 101 leaks from the starting end 113 or the terminating end 114.

A second embodiment of the present invention will be described with reference to FIG. 4. In the above embodiment, the starting end 113 corresponds to the position of the portion of the insulator 112, which covers the inlet pipe 106, and the terminating end 114 corresponds to the position of the portion of insulator 112, which covers the outlet pipe 107. However, according to this embodiment as shown in FIG. 4, both of the starting end 113 and the terminating end 114 correspond to the position of the insulator 112 of the inlet pipe 106.

Figure 4:
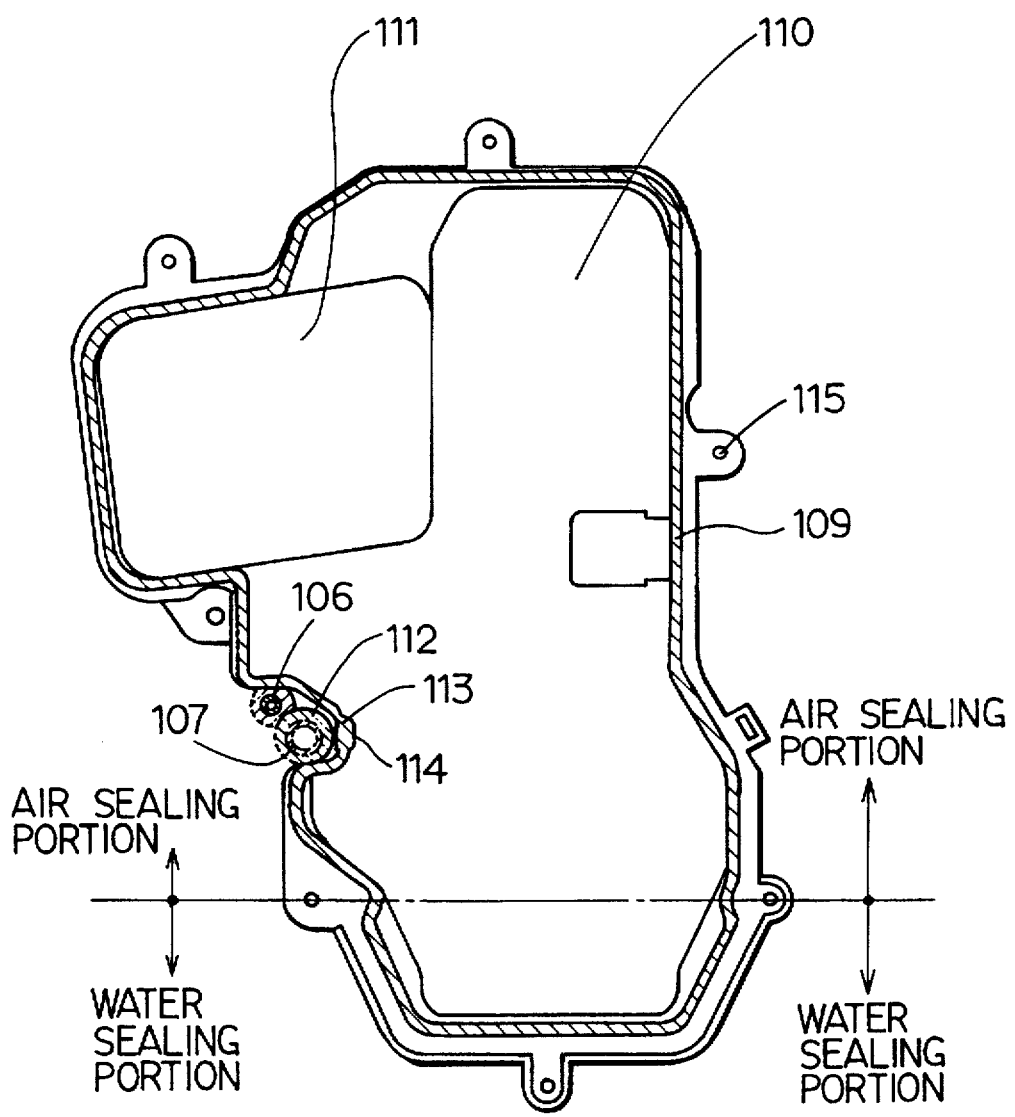
FIG. 4 illustrates a cover according to a second embodiment.

When the starting end 113 is not completely coincident with the terminating end 114, the starting and terminating ends 113 and 114 may overlap with each other as shown in FIG. 4, or a gap may be formed between the two ends. However, according to the second embodiment, such a gap will be covered with the insulator 112 so that no air will leak therefrom, as in the first embodiment.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. An air conditioning apparatus for a vehicle, comprising:
   an air conditioning body unit having an opening portion;
   an evaporator inserted into said air conditioning body unit through said opening portion, for cooling air passing in said air conditioning body unit;
   an inlet pipe extending from the opening portion to the outside of said air conditioning body unit, for introducing a coolant into said evaporator;
   an outlet pipe extending from said opening portion to the outside of said air conditioning body unit, for discharging the coolant from said evaporator;
   an insulator covering an outer surface of said inlet pipe and an outer surface of said outlet pipe, said insulator being disposed adjacent to an opening edge of said opening portion;
   a sealing member formed along a periphery of said opening portion of said air conditioning body unit, said sealing member having a starting end and a terminating end, both of which overlap with said insulator; and a cover for covering said opening portion of said air conditioning body unit so as to sandwich said sealing member between said cover and said opening portion.

2. An air conditioning apparatus according to claim 1, wherein said sealing member is formed of a fluidized foaming material containing isocyanate as a main component.

3. An air conditioning apparatus according to claim 1, wherein said sealing member is compressed to an initial compression rate of about 40–50% when said opening portion of said air conditioning body unit is covered with said cover.

4. An air conditioning apparatus according to claim 1, wherein said starting end said terminating end of said sealing member overlap with each other.

5. An air conditioning apparatus according to claim 1, wherein said insulator is formed of an ethylene-propylene rubber type foam material.

6. An air conditioning apparatus according to claim 1, wherein said sealing member is stuck to a surface of said cover.

7. An air conditioning apparatus according to claim 6, wherein said sealing member is formed by painting.

8. An air conditioning apparatus according to claim 1, wherein said insulator includes a first portion for said inlet pipe and a second portion for said outlet pipe.

9. An air conditioning apparatus according to claim 8, wherein said starting end overlaps with said first portion of said insulator and said terminating end overlaps with said second portion.

10. An air conditioning apparatus according to claim 8, wherein both of said starting end and said terminating end overlap with said second portion of said insulator.

* * * * *

UNITED STATES PATENT AND TRADEMARK OFFICE
CERTIFICATE OF CORRECTION

PATENT NO. : 5,737,936
DATED : April 14, 1998
INVENTOR(S) : Junji Takasaki

It is certified that error appears in the above-identified patent and that said Letters Patent is hereby corrected as shown below:

Col. 2, line 2, delete "unit:" and substitute --unit;-- therefor

Col. 2, line 58, after "selectively" suggest insert ---drawn--

Col. 3, line 45, delete "cover 10" and substitute --cover 110-- therefor

Col. 5, line 14, claim 4, after 1st occurrence of "end" insert --and-

Signed and Sealed this

Third Day of November, 1998

Attest:

BRUCE LEHMAN

*Attesting Officer*  *Commissioner of Patents and Trademarks*